United States Patent
Bonilla

(10) Patent No.: US 10,449,986 B1
(45) Date of Patent: Oct. 22, 2019

(54) TRANSPORT CART FOR BALLAST BLOCK

(71) Applicant: Anthony Bonilla, Bronx, NY (US)

(72) Inventor: Anthony Bonilla, Bronx, NY (US)

(*) Notice: Subject to any disclaimer, the term of this patent is extended or adjusted under 35 U.S.C. 154(b) by 135 days.

(21) Appl. No.: 15/810,330

(22) Filed: Nov. 13, 2017

(51) Int. Cl.
*B62B 5/00* (2006.01)
*B62B 3/04* (2006.01)
*B62B 3/10* (2006.01)

(52) U.S. Cl.
CPC .............. *B62B 5/0003* (2013.01); *B62B 3/04* (2013.01); *B62B 3/10* (2013.01); *B62B 2202/10* (2013.01); *B62B 2203/02* (2013.01); *B62B 2203/10* (2013.01)

(58) Field of Classification Search
CPC .................................................. B62B 5/0003
USPC ......................................................... 414/460
See application file for complete search history.

(56) References Cited

U.S. PATENT DOCUMENTS

| | | | | |
|---|---|---|---|---|
| 3,262,590 | A * | 7/1966 | Lynn | E04G 21/16 414/460 |
| 3,391,905 | A * | 7/1968 | Burns | B62B 3/0625 254/7 R |
| 4,715,762 | A * | 12/1987 | Lanigan, Sr. | B66C 19/007 212/324 |
| 4,941,645 | A * | 7/1990 | Hall | B62B 3/0637 254/324 |
| 5,114,295 | A * | 5/1992 | Jansson | B66C 19/007 212/326 |
| 5,338,015 | A | 8/1994 | Liegel et al. | |
| 5,373,593 | A * | 12/1994 | Decky | B62B 3/10 254/7 R |
| 5,709,397 | A | 1/1998 | Hall | |
| 6,419,440 | B1 * | 7/2002 | Smith | A61G 19/00 27/32 |
| 6,715,979 | B1 | 4/2004 | Theising et al. | |
| 6,886,192 | B1 * | 5/2005 | Merrill | B62B 3/10 254/7 R |
| 7,997,827 | B2 * | 8/2011 | Fogg | B63C 3/06 254/324 |
| 8,016,303 | B1 | 9/2011 | Ullman et al. | |

(Continued)

OTHER PUBLICATIONS

Gallagher Staging & Productions; G-Block & Ballast Support Rentals; Website; May 23, 2017; 4; http://www.gallagherstaging.com/gblock-rentals-ballast-support-rentals/.

(Continued)

*Primary Examiner* — Jonathan Snelting

(74) *Attorney, Agent, or Firm* — Goldstein Law Offices, P.C.

(57) ABSTRACT

A transport cart for transporting a ballast block upon a ground surface by a user. The ballast block has a front, rear, top, bottom, and has a plurality of fastening openings on the top. The transport cart has a main frame having a pair of parallel side members, a wheel assembly, a pair of overhead frames attached between the side members, and a cross member attaching the overhead frames. A lifting mechanism is attached to the cross member and includes a lifting arm extending parallel to the side members, and a pair of engagement plates attached to the lifting arm. The engagement plates fasten to the fastening openings on the top of the ballast block. The lifting arm is raised by rotating a handle to raise the block above the ground surface, whereupon the ballast block may be moved along the ground surface using the wheel assembly.

15 Claims, 8 Drawing Sheets

(56) References Cited

U.S. PATENT DOCUMENTS 8,960,625 B2    2/2015  Ma
2007/0110550 A1*  5/2007  Callens ................ B66C 19/007
                                                            414/460

OTHER PUBLICATIONS

B&R Innovations, LLC; Block and Roll Tent Ballast Solutions Archives; Website; May 23, 2017; 4; http://www.bandrinnovations.com/products/block-and-roll-tent-ballast-solutions/.

* cited by examiner

TRANSPORT CART FOR BALLAST BLOCK

TECHNICAL FIELD

The present disclosure relates generally to a transport cart. More particularly, the present disclosure relates to a cart that allows an individual to easily lift and transport a ballast block.

BACKGROUND

Ballast blocks are an essential item for a variety of rigging applications. In particular, when box trusses are deployed, ballast blocks provide a sufficiently heavy base to ensure stability and safety of the truss.

A typical ballast block weighs several thousand pounds. Often constructed of steel and filled with concrete, the considerable weight of the block helps it fulfill its ballasting purpose. This considerable weight, however, makes it difficult to transport and accurately position during installation, and then remove after use.

Heavy equipment, such as forklifts, can easily pick up and move the ballast block. Such heavy equipment, however, is impractical for most installations. In particular, in the tight backstage areas of many theaters and venues it is not possible to navigate a forklift. In addition, when the actual installation calls for locating the ballast block in close proximity to other equipment and support structures, a forklift cannot be used. Further, even when using a forklift is possible, the expense of renting, transporting, operating, and removing the forklift can be prohibitive.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to effectively lift and transport a ballast block. Accordingly, a cart is provided that has a lifting mechanism and a frame, as the frame surrounds the ballast block, the lifting mechanism has a lifting arm that engages the ballast block so that it can be raised above the ground surface. The cart has a wheel assembly including caster wheels, which allow the block to be moved to a target destination and then lowered.

It is another aspect of an example embodiment in the present invention to provide a transport cart that is easily and safely operated by an individual. Accordingly, when the block is engaged by the lifting arm, the block is fully contained by the frame and within an area bounded by the caster wheels, preventing the cart from tipping.

It is still another aspect of an example embodiment in the present invention to provide a transport cart that securely holds the ballast block during transport to prevent personal injury and property damage. Accordingly the ballast block is securely fastened to the lifting arm prior to raising the ballast block off of the ground surface, and remains fastened until after the ballast block is lowered back onto the ground.

Accordingly, the present disclosure describes a transport cart for transporting a ballast block upon a ground surface by a user. The ballast block has a front, rear, top, bottom, and has a plurality of fastening openings on the top. The transport cart has a main frame having a pair of parallel side members, a wheel assembly, a pair of overhead frames attached between the side members, and a cross member attaching the overhead frames. A lifting mechanism is attached to the cross member and includes a lifting arm extending parallel to the side members, and a pair of engagement plates attached to the lifting arm. The engagement plates fasten to the fastening openings on the top of the ballast block. The lifting arm is raised by rotating a handle to raise the block above the ground surface, whereupon the ballast block may be moved along the ground surface using the wheel assembly.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
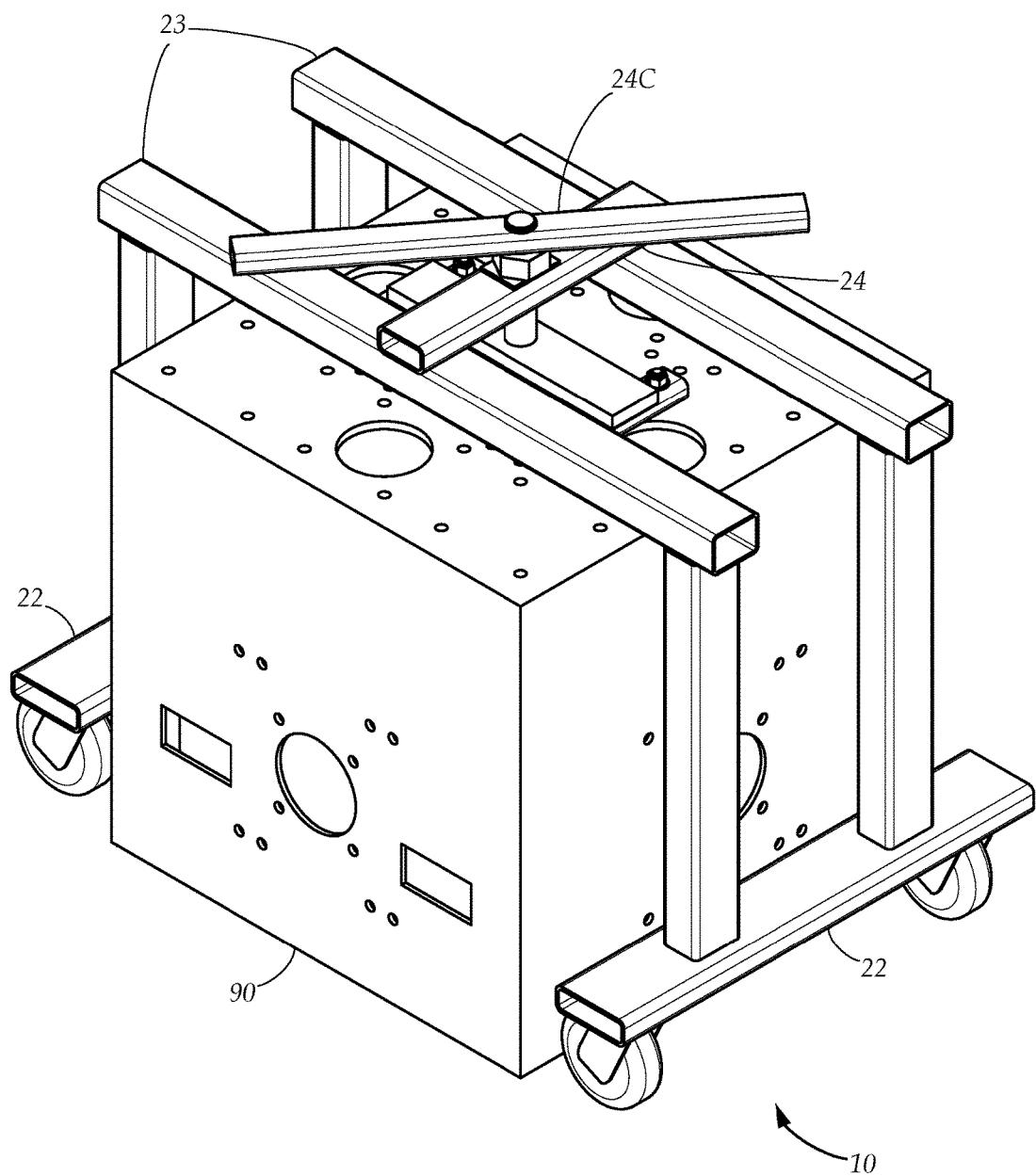
FIG. 1 is diagrammatic perspective view, illustrating the transport cart in conjunction with the ballast block.
Figure 2:
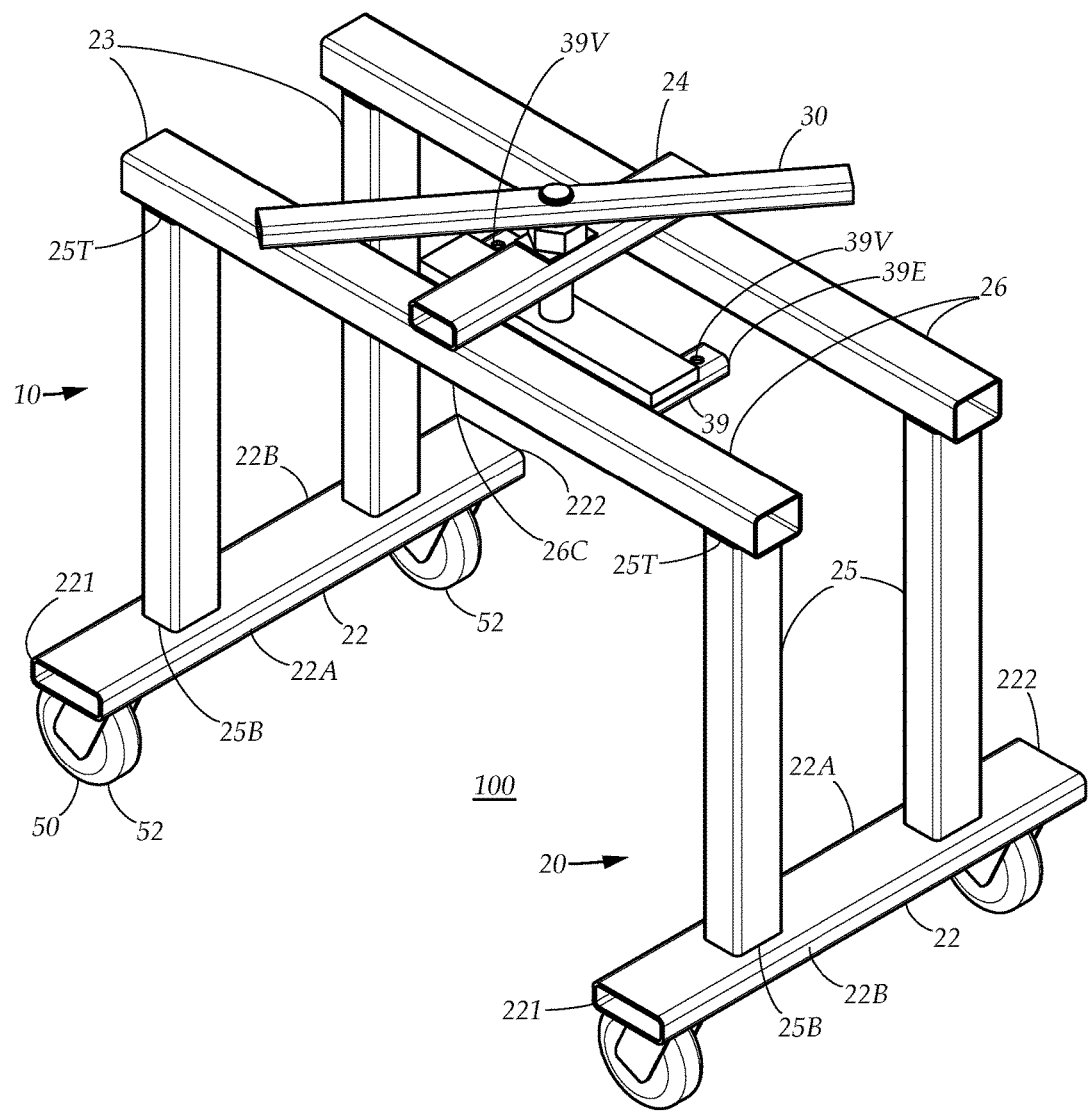
FIG. 2 is a diagrammatic perspective view, illustrating the transport cart, per se.

FIG. 1 and FIG. 2 illustrate a transport cart 10, having a main frame 20, a lifting mechanism 30, and a wheel assembly 50. The main frame 20 includes a pair of side members 22 that extend substantially parallel to each other, a pair of overhead frames 23, and a cross member 24 that is attached to and extends perpendicular to both overhead frames 23. The side members 22 each have a bottom 22B, an inner edge 22A, a first end 22I, and a second end 22II. The cross member 24 extends between the first ends 22I of the side members 22 and the second ends 22II of the side members 22. The main frame 20 is open between the second ends 22II of the side members 22 and the first ends 22I of the side members 22, and defines an open space bound by the inner edges 22A of the side members 22 and the overhead frames 23.

The overhead frames 23 each having a pair of vertical members 25 and a horizontal member 26. The vertical members 25 each have a top end 25T and a bottom end 25B. The vertical members 25 are each attached to one of the horizontal members 26 at its top end 25T and to one of the side members 22 at its bottom end 25B. Note that the overhead frames 23 are substantially parallel to each other such that one of the overhead frames 23 is attached near the first ends 22I of both side members 22 and the other of the overhead frames is attached near the second ends 22II of both side members 22. The horizontal members 26 have a pair of ends, and a center 26C. The cross member 24 extends between the centers 26C of the horizontal members 26. The cross members 24 also has a center 24C.

The wheel assembly 50 includes caster wheels 52 which are attached to the frame 20 and rest upon a ground surface 100. Note that the ground surface 100 is merely a reference plane. It need not be the actual "ground" surface, and can be an elevated surface, such as a stage, riser, platform, loading dock, or the like. Preferably four caster wheels 52 are attached to the bottom of the side members 22: one of the caster wheels 52 at the first end 22I and second end 22II of each side member 22 of the frame 20. The side members 22, cross members 24 and horizontal members 26 all extend parallel to the ground surface 100.

Figure 6:
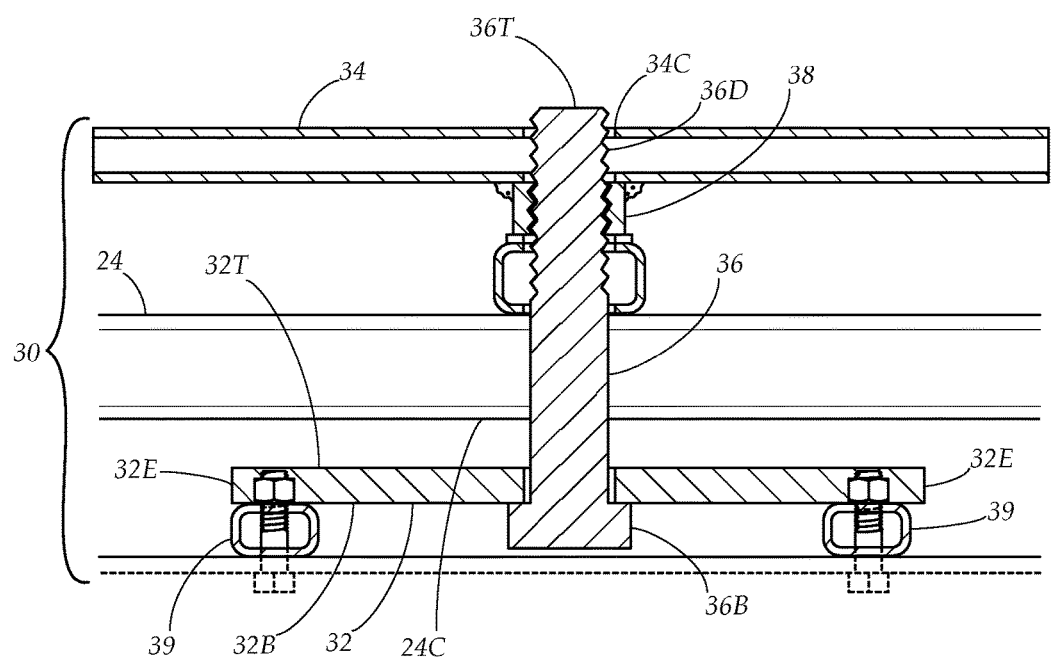
FIG. 6 is a side elevational view with parts broken away, illustrating the lifting mechanism and engagement with the ballast block.

Referring to FIG. 6, the lifting mechanism 30 includes a lifting arm 32, a handle 34, a main shaft 36, and a threaded sleeve 38. The handle 34 has a center 34C. The main shaft 36 has a top 36T, a bottom flange 36B, and a threaded portion 36D. The main shaft 36 extends through the center 34C of the handle 34, through the threaded sleeve 38, through the center 24C of the cross member 24, and through the lifting arm 32. The threaded sleeve 38 is internally threaded 38 and is rigidly attached to the handle 34. The threaded sleeve 38 is rigidly attached to the handle 34, such as by welding as shown. Accordingly, as the handle 34 is rotated about its center 34C, the main shaft 36 is advanced vertically by interaction between the threaded sleeve 38 and the threaded portion 36D of the main shaft 36, lifting or lowering the lifting arm 32 by interaction between the bottom flange 36B and the lifting arm 32.

Figure 5:
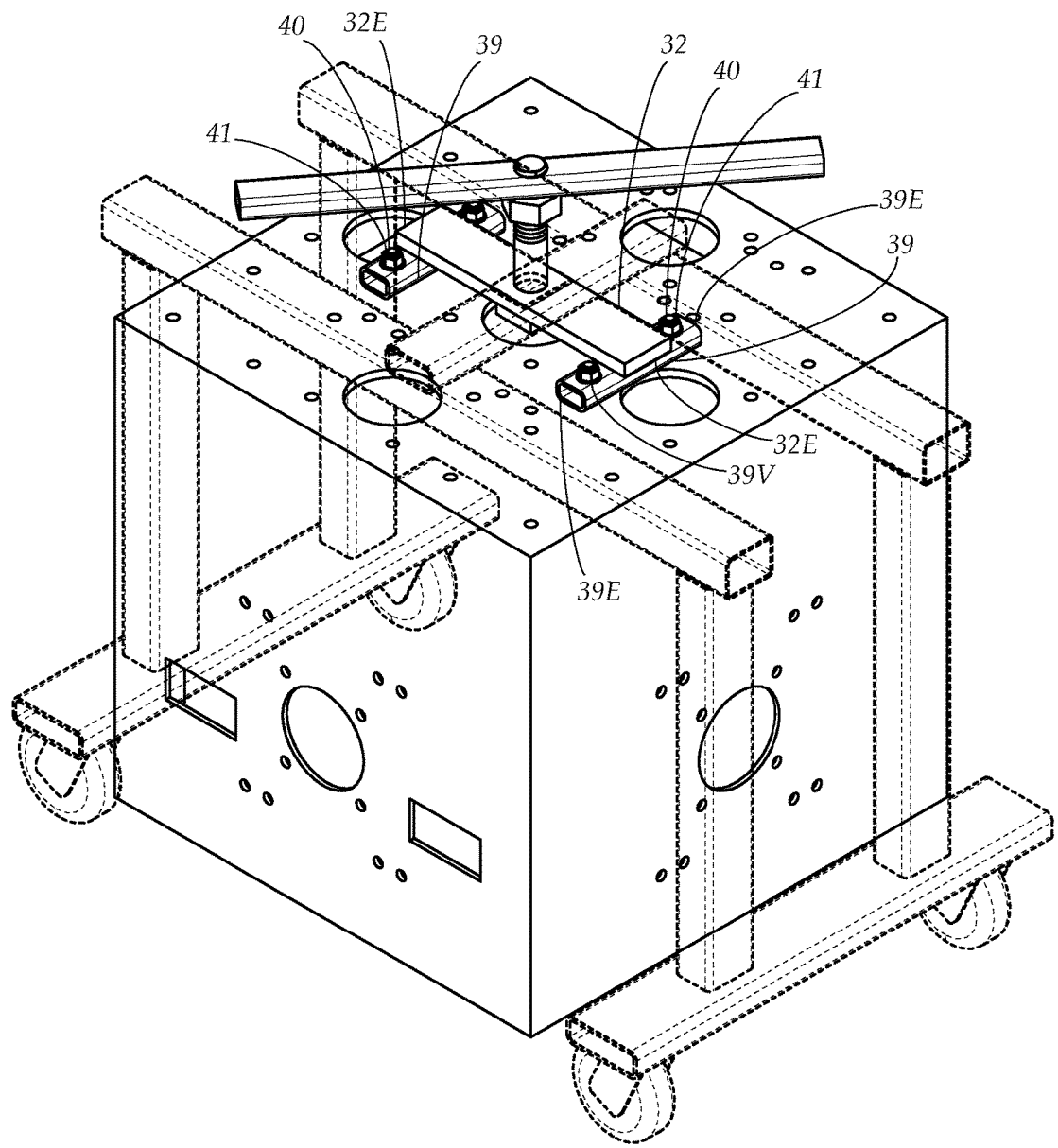
FIG. 5 is a diagrammatic perspective view, similar to FIG. 2, wherein portions of the transport cart are shown in phantom lines.

The lifting arm has a top surface 32T, a bottom surface 32B, and a pair of ends 32E. The lifting mechanism 30 also includes a pair of engagement plates 39. Referring to FIG. 5, each of the engagement plates 39 is attached to the lifting arm 32 at one of the ends 32E of the lifting arm 32. The engagement plates 39 each have a pair of ends 39E. A vertical bore 39V (also seen in FIG. 2) extends through each of the engagement plates 39 at each of its ends 39E.

Figure 4:
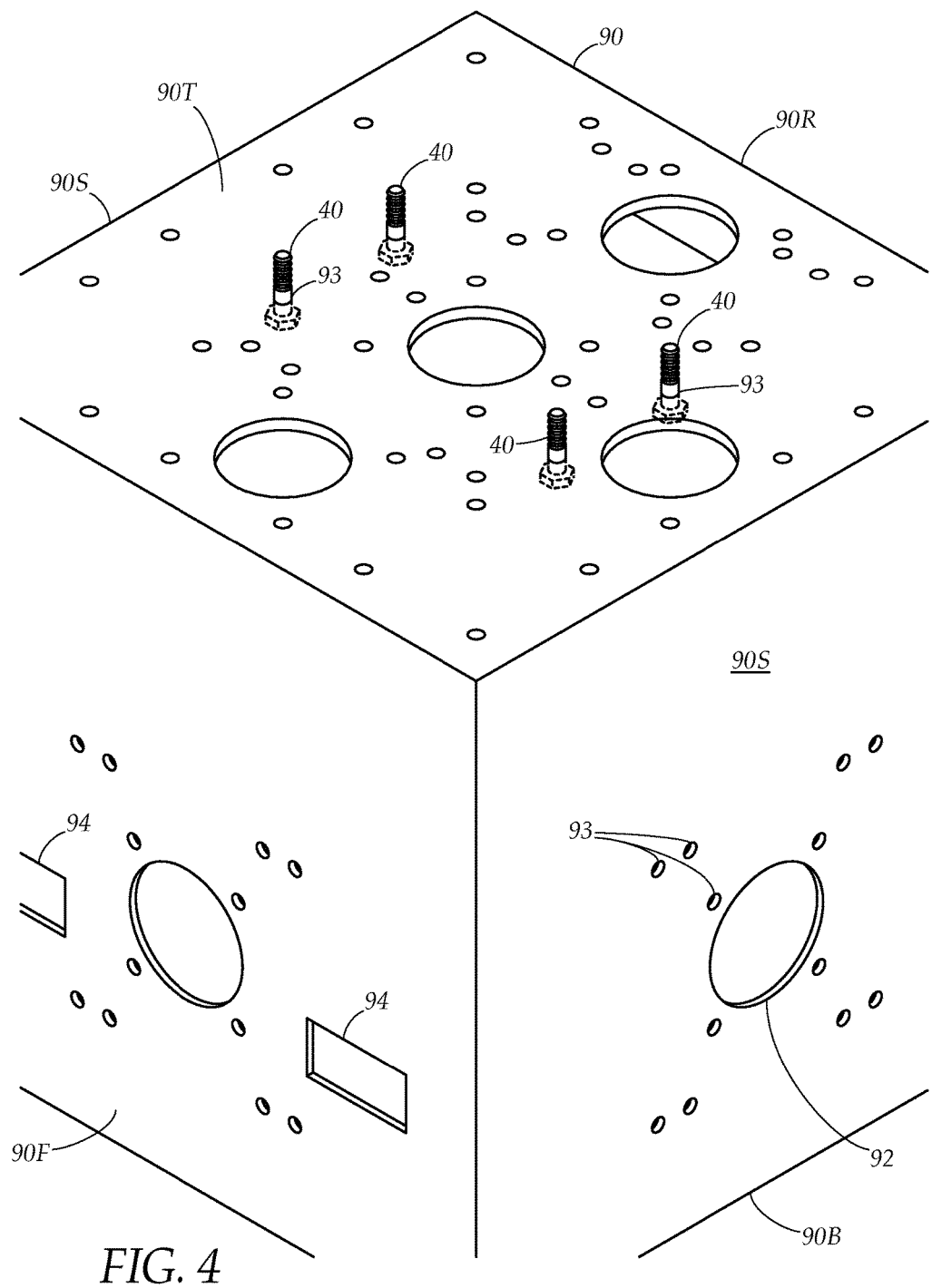
FIG. 4 is a diagrammatic perspective view, illustrating the ballast block with fastener rods extending therethrough.

FIG. 4 illustrates a ballast block 90, having a front 90F, a rear 90R, and sides 90S, a top 90T, and a bottom 90B. Note that designations of the front 90F, rear 90R, and sides 90S do not strictly dictate orientation of the block 90 during its intended use, but is only meant to establish relative orientation for the sake of the discussion and comparison through the drawing figures. The block 90 has a block length between the front 90F and rear 90R, and a block width between the sides 90S. The sides 90S, front 90F, and rear 90R may have large openings 92 that are surrounded by mounting holes 93 intended for mounting another device to be ballasted by the ballast block 90. The mounting holes 93 may be arranged in any configuration, and are preferably matched for an intended use of the block 90. For example, the mounting holes 93 may be configured to match and mount to a box truss. The large openings 92 include receiver openings 94 located on the front 90F and rear 90R, and preferably centered laterally thereon, that may include a receiver tube that extends between the receiver openings 94 on the front 90F and rear 90R. The front 90F, rear 90R, top 90T, bottom 90B, and sides 90S are typically made of steel. Note that the ballast block 90 is shown hollow for clarity, but is typically substantially filled with concrete or a similar heavy material. Referring to FIG. 4, some of the mounting holes 93 are located in standard or reliable positions that facilitate use of the cart as described hereinbelow. In particular, four fastener rods 40 are shown extending through the mounting holes 93 on the top 90T of the block 90. The fastener rods 40 may be threaded items such as bolts as shown, or may be other fasteners that are capable of securing (such as with a pin) to prevent longitudinal movement thereon. After extending through the top 90T of the block 90, now referring to FIG. 5, the fastener rods 40 each extend through the vertical bores 39V of the engagement plates 39 and are fastened thereagainst with a nut 41 associated with said fastener rod 40.

Figure 3:
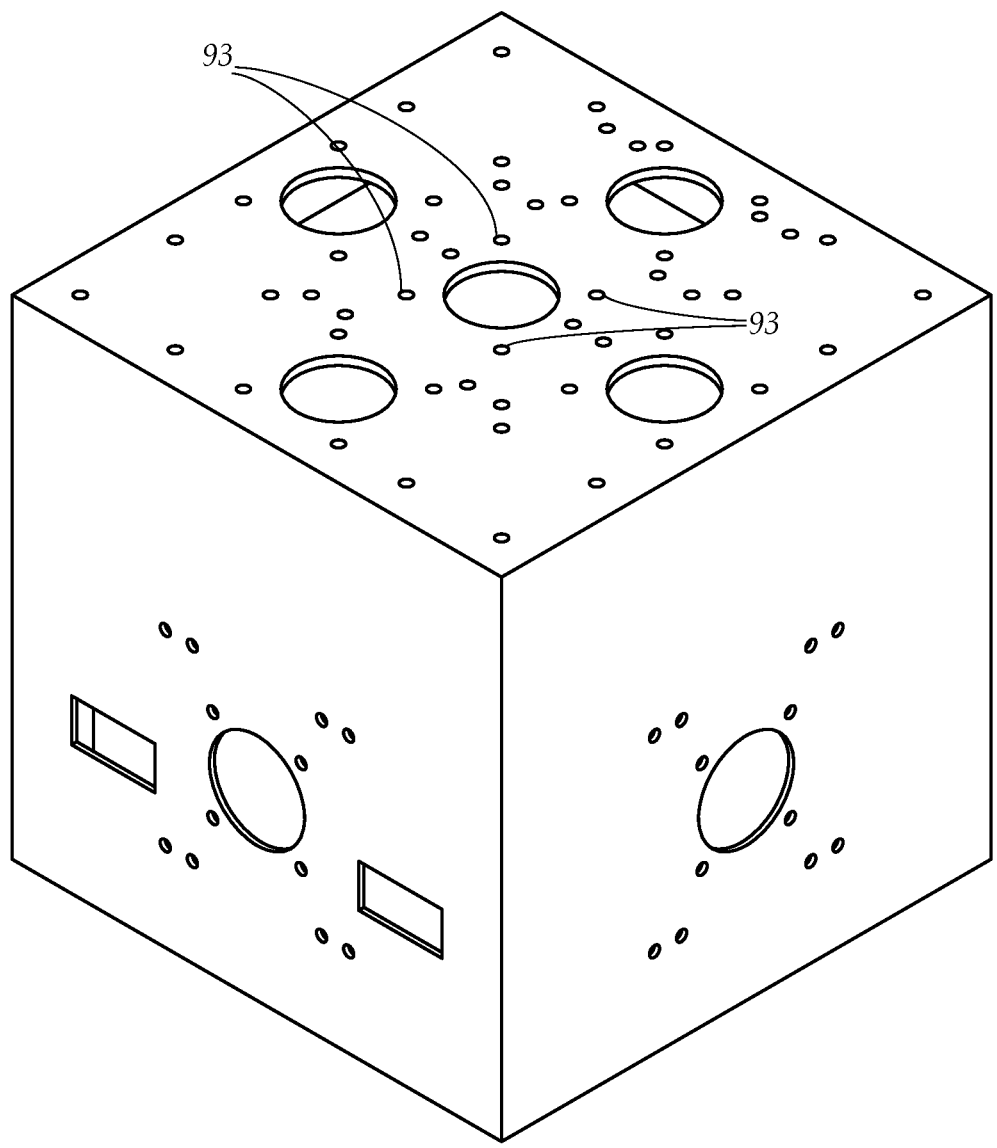
FIG. 3 is a diagrammatic perspective view, illustrating the ballast block, per se.
Figure 7A:
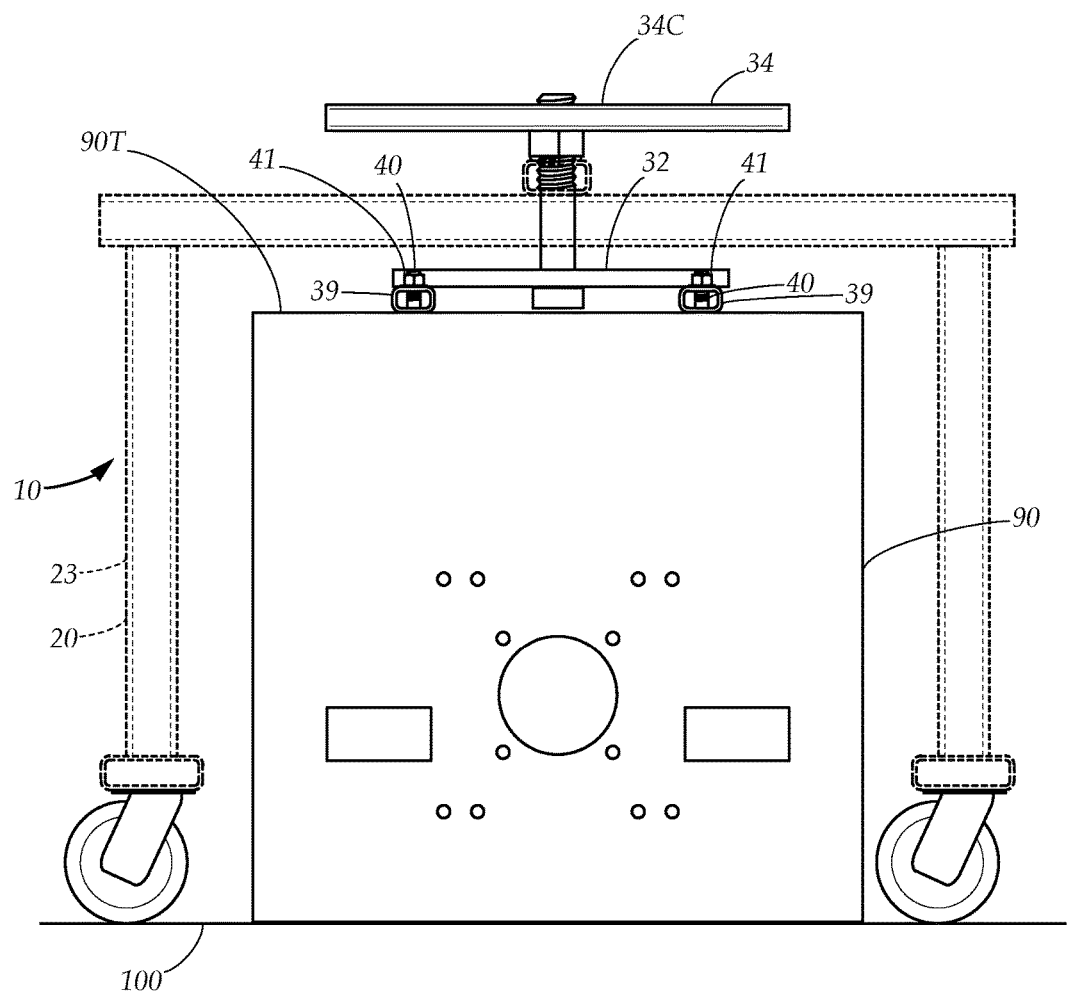
FIG. 7A is a diagrammatic perspective view, illustrating the lifting arm engaged with and about to lift the ballast block.

Referring to FIG. 7A, prior to use, the cart 10 may be stored in a lowered position, wherein the lifting arm 32 and engagement plates 39 are lowered. The cart 10 is positioned over the block 90, with the overhead frames 23 extending over the block 90 (also see FIG. 1). The vertical bores 39V (see FIG. 2) are aligned with the mounting holes 93 indicated in FIG. 3. Referring again to FIG. 7A, the engagement plates 39 engage the top surface 90T of the block 90 and is fastened thereto with the fastener rods 40 and nuts 41. The block 90 may now be lifted by rotating the handle 34 about its center 34C. Note that the handle is shown as a bar or lever in the example indicated, buy may also be configured as a wheel, a crank, or the like.

Figure 7B:
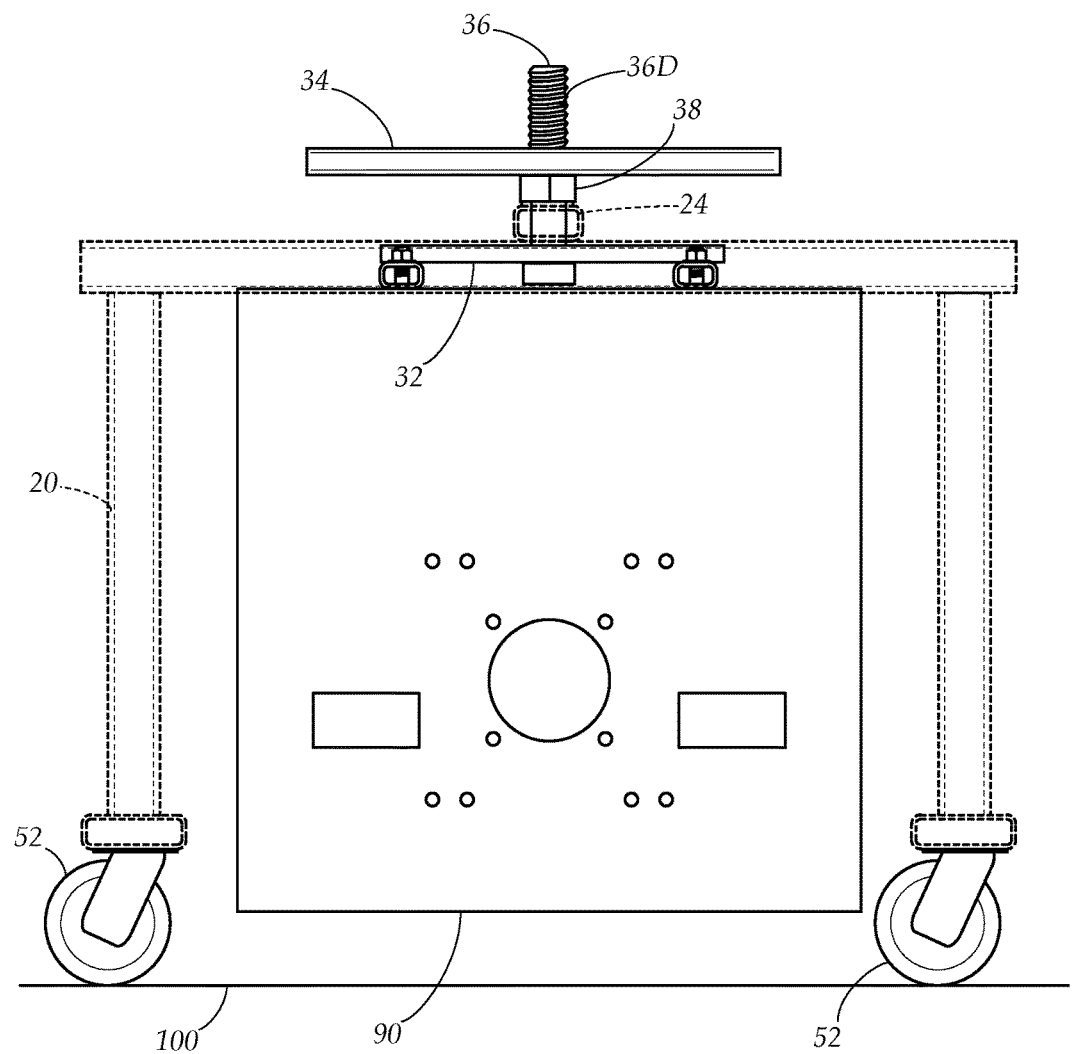
FIG. 7B is a diagrammatic perspective view, illustrating the lifting arm in a raised position, wherein the ballast block is raised above the ground surface and is ready for transport.

Referring to FIG. 7B, as the handle 34 is rotated, the threaded portion 36D of the main shaft 36 advances upwardly through the threaded sleeve 38 and through the handle 34, raising the lifting arm 32 to a raised position where it extends against the cross member 24. With the block 90 hoisted above the ground surface 100, the cart can be rolled along the ground surface 100 by the caster wheels 52, by pushing upon the main frame 20. Once the block 90 is located at a desired destination, the block 90 is lowered to the ground by again rotating the handle 34, until the block 90 is resting upon the ground surface 100 as seen in FIG. 7A. Referring to both FIGS. 7A and 7B, then the nuts 41 and fastener rods 40 can be removed to free the block 90 from the cart 10, and the cart is rolled away. Note that in some embodiments, the fastener rods may be present in the block prior to positioning the cart 10 over the block 90 or may remain in the block after the cart 10 is rolled away. In such embodiments, the lifting arm 32 may be raised prior to positioning the frame 20 over the block 90 and then when positioning the frame 20 over the block, the engagement plates 39 are specifically aligned with the fastener rods 40, which then extend through the engagement plates 39 as the lifting arm 32 is lowered. Then, after the block 90 is transported and the nuts 41 are freed from the fastener rods 40, the lifting arm 32 is raised so that the engagement plates 39 are clear of the fastener rods 40, so that the cart 10 can be rolled away. In sum, if the fastener rods are not present in the block 90, the cart 10 can be easily positioned over or away from the block without raising or lowering the lifting arm 32. But if the fastener rods are present, the overall operation described may require first raising the lifting arm 32, then positioning the cart 10 over the block 90, then raising the block 90, moving the block 90 to its destination, lowering the block 90, and again raising the lifting arm 32 before moving the cart 10 away from the block 90.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a transport cart, configured for lifting and moving a ballast block. The disclosure is illustrated by example in the drawing figures, and throughout the written description. It should be understood that numerous variations are possible, while adhering to the inventive concept. Such variations are contemplated as being a part of the present disclosure.

What is claimed is:

1. A transport cart, for lifting and moving a ballast block upon a ground surface, the ballast block having a front, a rear, a top, and a bottom, and having mounting holes on the top, comprising:
    a main frame having a pair of side members that extend parallel to each other, the side members each having a first end and a second end, a pair of overhead frames that extend parallel to each other and attach to the side members, the overhead frames each having a pair of vertical members that are each attached to one of the side members and a horizontal member that extends between the vertical members, the main frame further having a cross member attached and extending between the horizontal members, wherein the overhead frames create an opening below the horizontal members so that the main frame is adapted for extending over the ballast block with said ballast block beneath the horizontal members;
    a wheel assembly attached to the frame, adapted for supporting and moving the frame upon the ground surface and positioning the horizontal members directly above the ballast block; and
    a lifting mechanism including a lifting arm centered between and parallel to the horizontal members of the overhead frames, a main shaft having a threaded portion and extending through the cross member, a threaded sleeve that is internally threaded, a handle that is rigidly attached to the threaded sleeve, the lifting arm attached to the main shaft, the handle for selectively raising and lowering the lifting arm by rotating the main shaft and interacting the threaded portion with the threaded sleeve, the lifting arm having a pair of engagement plates adapted for securing to the mounting holes of the ballast block so that when the lifting arm is raised, the block is lifted above the ground surface.

2. The transport cart as recited in claim 1, wherein the lifting arm has a top surface and a bottom surface, wherein the engagement plates are attached to the bottom surface, and wherein each engagement plate has a pair of ends and a vertical bore near each of the ends.

3. The transport cart as recited in claim 2, wherein one of the overhead frames is attached near the first ends of the side members and the other of the overhead frames is attached near the second ends of the side members.

4. The transport cart as recited in claim 3, further comprising four fastener rods, each of the fastener rods adapted for extending through one of the mounting holes in the ballast block, and through one of the vertical bores in one of the engagement plates.

5. The transport cart as recited in claim 4, wherein the wheel assembly includes four caster wheels, the caster wheels located at the first and second end of each of the cross members, and wherein the frame is adapted to accommodate the block fully between the side members so that the weight of the ballast block is always located between the caster wheels.

6. The transport cart as recited in claim 5, wherein the handle has a center and the lifting arm has a center, wherein the main shaft extends through the center of the handle and the center of the lifting arm, and wherein the main shaft is threaded so that raising and lowering the lifting arm is accomplished by rotating the handle around the center of the handle.

7. A transport cart for use upon a ground surface, comprising:
a ballast block having a front, a rear, a top, a bottom, and mounting holes on the top;
a main frame having a pair of side members that extend parallel to each other, the side members each having a first end and a second end, a pair of overhead frames that extend parallel to each other and attach to the side members, the overhead frames each having a pair of vertical members that are each attached to one of the side members and a horizontal member that extends between the vertical members, the main frame further having a cross member attached and extending between the horizontal members, wherein the overhead frames create an opening below the horizontal members so that the main frame for extending over the ballast block with said ballast block beneath the horizontal members;
a wheel assembly attached to the frame, adapted for supporting and moving the frame upon the ground surface and positioning the horizontal members directly above the ballast block; and
a lifting mechanism including a lifting arm centered between and parallel to the horizontal members of the overhead frames, a main shaft extending through the cross member, and a handle for selectively raising and lowering the lifting arm by rotating the main shaft, the lifting arm attached to the main shaft, the lifting arm having a pair of engagement plates, the lifting mechanism including fastener rods adapted for securing the mounting holes of the ballast block to the engagement plates so that when the lifting arm is raised, the block is lifted above the ground.

8. The transport cart as recited in claim 7, wherein the lifting arm has a top surface and a bottom surface, wherein the engagement plates are attached to the bottom surface, and wherein each engagement plate has a pair of ends and a vertical bore near each of the ends.

9. The transport cart as recited in claim 8, wherein one of the overhead frames is attached near the first ends of the side members and the other of the overhead frames is attached near the second ends of the side members.

10. The transport cart as recited in claim 9, wherein each of the fastener rods are threaded rods adapted for extending through one of the mounting holes in the ballast block and through one of the vertical bores in one of the engagement plates, and further comprising a nut associated with each of the fastener rods for engaging and securing to said fastener rod.

11. The transport cart as recited in claim 10, wherein the wheel assembly includes four caster wheels, the caster wheels located at the first and second end of each of the cross members, and wherein the frame is adapted to accommodate the block fully between the side members so that the weight of the ballast block is always located between the caster wheels.

12. A method of transporting a ballast block upon a ground surface by a user, the ballast block having a front, a rear, a top, and a bottom, and mounting holes on the top, using a transport cart as recited in claim 1, comprising the steps of:
engaging the ballast block with the lifting arm;
fastening the ballast block to the lifting arm;
lifting the ballast block by raising the lifting arm to a raised position; and
moving the ballast block across the ground surface by pushing the frame by the user.

13. The method of transporting a ballast block as recited in claim 12, wherein the steps as recited are preceded by the step of positioning the lifting assembly and the overhead frames over the top of the block, and wherein the step of engaging the ballast block with the lifting arm further comprises lowering the lifting arm by operating the handle.

14. The method of transporting a ballast block as recited in claim 13, wherein the handle has a center and the lifting arm has a center, wherein a main shaft extends through the center of the handle and the center of the lifting arm, and wherein the step of lowering the lifting arm by operating the handle further comprises rotating the handle around the center of the handle.

15. The method of transporting a ballast block as recited in claim 14, wherein the lifting assembly includes a pair of engagement plates, each engagement plate having a pair of vertical bores, wherein the lifting arm has a pair of opposite ends, one of the engagement plates is attached at each of the opposite ends; wherein the step of positioning the lifting assembly and the overhead frames over the top of the block further comprises aligning the vertical bores of the engagement plates with the mounting holes of the block; and wherein the step of fastening the ballast block to the lifting arm further comprises extending a fastener rod through one of the vertical bores and through one of the mounting holes.

* * * * *